April 2, 1940.  G. E. THOMPSON ET AL  2,195,831
POWER MOWER
Filed July 18, 1938  2 Sheets-Sheet 2

INVENTORS
Geo. E. Thompson
John E. Thompson
BY
ATTORNEY

Patented Apr. 2, 1940

2,195,831

UNITED STATES PATENT OFFICE 2,195,831

POWER MOWER

George E. Thompson and John E. Thompson, Tracy, Calif.

Application July 18, 1938, Serial No. 219,817

3 Claims. (Cl. 56—25)

This invention relates generally to an agricultural implement, and in particular the invention is directed to a self-propelled power mower.

The principal objects of my invention are to provide, in an implement of the class described, a simple and noiseless safety slip friction drive for the mower, and a novel mounting and easy control for such drive; the drive providing ample power or leverage to the mower pitman. The mower drive includes no gears and thus is not only noiseless but there is no tendency for loose play to develop in the mechanism as occurs in present mower drives which incorporate gears.

Another object of my invention is to provide a self-propelled power mower which may be manufactured from a reconstructed motor vehicle; the implement having relatively fast cutting and road speeds, and yet constructed for long life at a minimum of maintenance cost. If desired, the implement, when not in use as a mower, may be used as a handy farm vehicle for towing hayrakes, wagons, and the like.

A further object is to provide a mower operating structure which may be connected to a standard mower with but few, if any, changes on the latter being necessary.

A further object of the invention is to produce a simple and inexpensive implement and yet one which will be exceedingly effective for the purpose for which it is designed.

These objects we accomplish by means of such structure and relative arrangement of parts as will fully appear by a perusal of the following specification and claims.

In the drawings similar characters of reference indicate corresponding parts in the several views.

Figure 1:
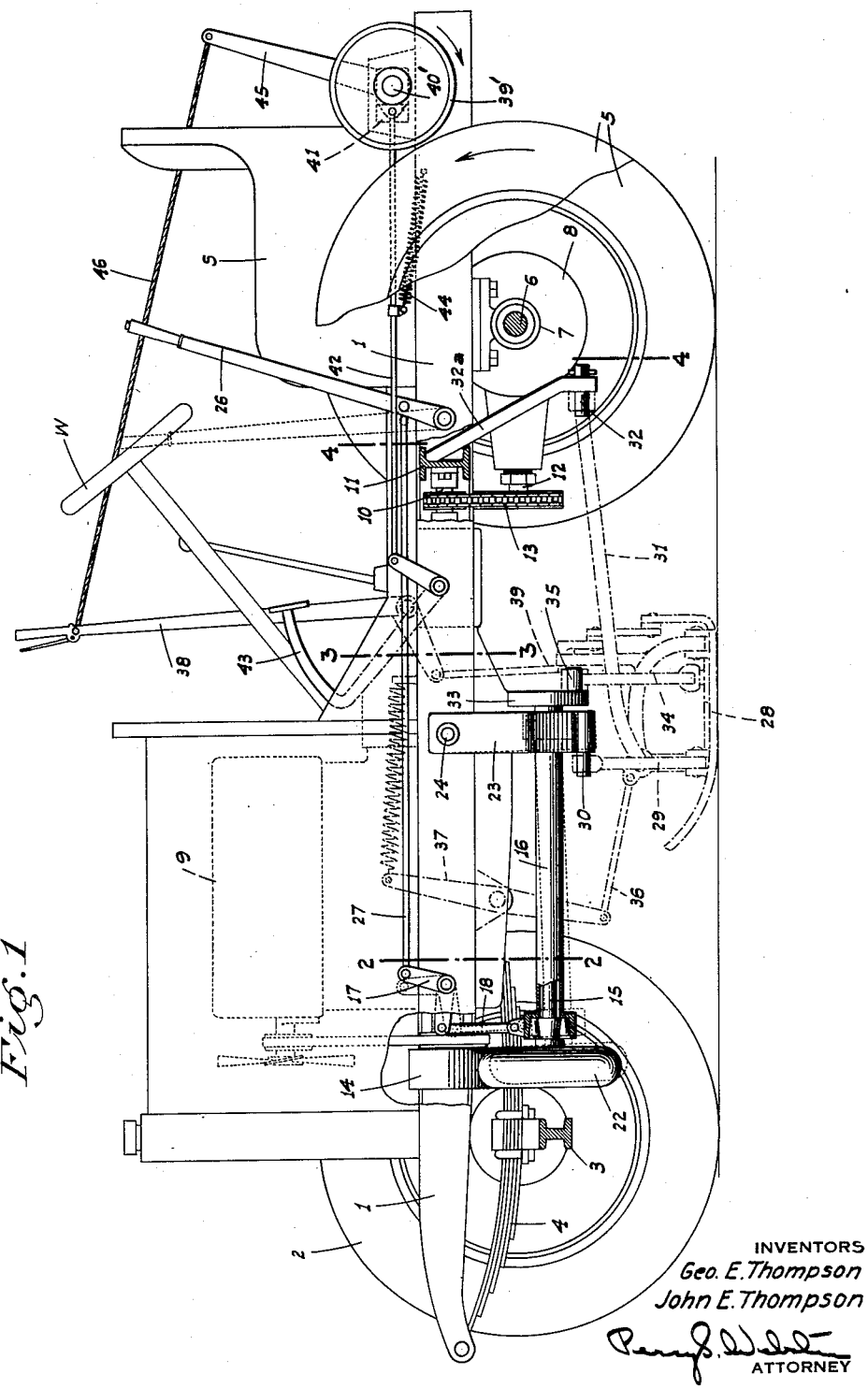
Figure 1 is a side elevation, partly in section, of the implement.
Figure 2:
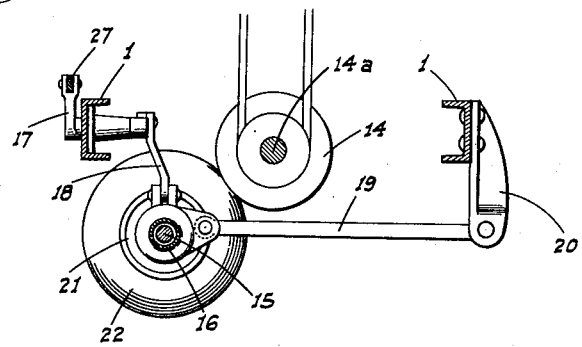
Figure 2 is a fragmentary cross section on line 2—2 of Fig. 1.

Referring now more particularly to the characters of reference on the drawings, the implement comprises a relatively short motor vehicle chassis having side frames 1 supported at the front end by means of steerable wheels 2 carried by axle 3 mounted in connection with springs 4 as is usual, and supported at the rear end by wheels 5 whose axle unit 6 is journaled in a housing 7 which is mounted directly on the frames. The axle unit 6 is driven from a conventional differential 8. A steering wheel W is operatively connected with wheels, and a seat 5 is mounted on the frame so that a person seated then can grasp said steering wheel.

A power plant 9 of standard motor vehicle type, is carried by the frame and is provided with the usual controls such as clutch, gear shift lever, throttle, etc. The transmission drive shaft 10 projects out only a short distance and at its rear end is journaled on an eye beam 11 which is mounted transversely of the frame. The differential is also provided with a stub shaft 12; the shafts 10 and 12 being vertically alined and connected in driving relation by means of a high speed chain drive assembly 13.

A drum 14 is fixed on the forward end of the crank shaft 14a of the power plant 9; the drum being accessible from beneath and to one side for the purpose hereinafter described. A substantially horizontal shaft 15 is journaled in a tubular housing 16 whose forward end is disposed adjacent but below and to one side of drum 14 and is suspended at said end from a frame mounted bell crank lever 17 by means of a pivoted link 18. A pivoted tie rod 19 extends transversely from said end of the housing beneath the engine to connection with a bracket 20 depending from the frame on the other side of the vehicle. The shaft 15 projects beyond the forward end of housing 16 and a small wheel 21, carrying a pneumatic rubber tire 22, is fixed on said projecting shaft portion. The tire 22 is positioned and adapted for frictional driving engagement with drum 14.

Figure 3:
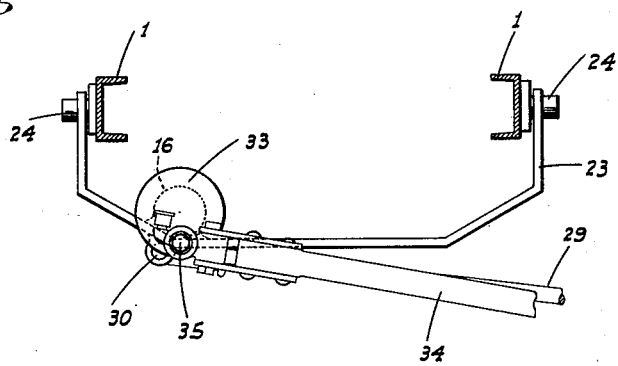
Figure 3 is a fragmentary cross section on line 3—3 of Fig. 1.
Figure 4:
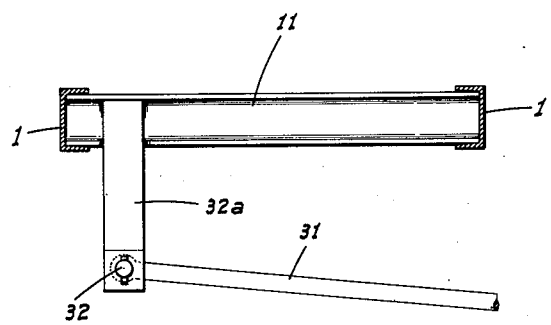
Figure 4 is a fragmentary cross section on line 4—4 of Fig. 1.

The rear end of housing 16 is supported by and is fixed with a transverse yoke 23 whose ends are pivoted as at 24 to corresponding sides of the frame 1 as clearly shown in Fig. 3. As the yoke is pivoted, the forward end of the housing can be raised or lowered to engage or disengage tire 22 from drum 14. Such control of the housing is accomplished by means of a hand lever 26 operatively connected with bell crank lever 17 by means of a rod 27.

A mower of any standard construction, indicated generally at 28, extends laterally outward from the side of the chassis opposite the shaft 15 and intermediate the front and rear wheels; the front brace rod 29 of the mower being connected with a pin 30 projecting horizontally from yoke 23, while the rear brace rod 31 is connected as shown with a pin 32 on the lower end of a rigid arm 32a which is rigidly mounted on and depends from transverse eye beam 11, the pins 32 and 30 being substantially alined. The rear end of shaft 15 extends beyond the housing 16 and the pitman wheel 33 is fixed thereon; the pitman rod 34 being journaled on the pitman shaft 35 in the usual manner. The tie or draft rod 36 which is connected to the tongue in a horse drawn mower is here connected to one end of a spring urged lever 37 pivoted on the frame.

The mower lifting lever 38 is pivoted on the frame of the chassis and is connected with the mower by means of standard linkage 39. In order to facilitate movement of this lever 38 in a mower lifting direction, I provide a power unit connected therewith. Such unit comprises a drum 39' disposed adjacent and in alinement with one rear wheel 5, the drum being supported by a shaft 40' journaled in a slide block assembly 41 which is mounted on the frame in position so that the drum can be moved into and out of engagement with the tire of the adjacent wheel 5. Such movement is accomplished by means of a rod 42 connected between the assembly 41 and a foot lever 43. A tension spring 44 connected between the rod and frame urges the rod in a direction to normally hold drum 39' free of the wheel tire. A radial arm 45 is fixed on shaft 40' in upstanding relation and a flexible cable 46 connects the upper end of the arm 45 and upper end of lever 38. Thus, with depression of pedal 43, drum 39' frictionally engages the wheel tire resulting in arm 45 being swung backwards drawing on cable 46 and moving lever 38 in a mower lifting direction.

Operation

The operation or drive of the mower is accomplished as follows:

With the mower in cutting position and the engine running, lever 26 is actuated so as to move tire 22 into frictional engagement with rotating drum 14 causing rotation of shaft 15 which drives the pitman of the mower. As the tire 22 can be held in close frictional contact with drum 14, ample power is supplied to the mower; but should the mower strike an object and jam, the tire may slip on drum 14 and thus prevents unnecessary damage. The use of a yieldable pneumatic tire for the friction drive wheel, enables a greater arc of contact with drum 14 to be obtained than would otherwise be the case.

The implement has a cutting speed of 3–5 miles per hour and a road speed of about 30 miles per hour.

From the foregoing description it will be readily seen that we have produced such an implement as substantially fulfills the objects of the invention as set forth herein.

While this specification sets forth in detail the present and preferred construction of the implement, still in practice such deviations from such detail may be resorted to as do not form a departure from the spirit of the invention, as defined by the appended claims.

Having thus described our invention, what we claim as new and useful and desire to secure by Letters Patent is:

1. A power drive for the pitman rod of a vehicle supported and drawn mower comprising, with an engine on the vehicle, a drum driven from said engine, a wheel having a resilient radially yieldable tire thereon alined with the drum, drive means between said wheel and the pitman rod and means mounting the drum and wheel for relative movement toward each other so that the tire may be engaged with the drum in frictional driving relation and with varying extents of the area of contact.

2. A power drive for the pitman rod of a vehicle supported laterally projecting mower comprising, with an engine on the vehicle having a drive shaft extending lengthwise thereof, an exposed drum mounted on the drive shaft at its forward end, a rotatable substantially horizontal shaft extending rearwardly from the transverse plane of the drum below and laterally offset from the axes thereof on the side of the vehicle opposite that from which the mower extends, a circular friction member on the forward end of the rotatable shaft to engage the drum, and a mower pitman wheel on the rear end of said shaft, means mounting the shaft on the vehicle for movement in a direction to place the friction member in frictional engagement with the drum and manually controlled means to effect such movement.

3. A structure as in claim 2, in which said shaft mounting means comprises a housing in which the shaft is mounted, a transverse swing yoke supporting the housing adjacent its rear end and mounted on the vehicle, the manually controlled means supporting the housing adjacent its forward end, and a transverse tie rod pivoted at one end on the housing adjacent said forward end on the side of the vehicle opposite the housing.

GEORGE E. THOMPSON.
JOHN E. THOMPSON.